(12) United States Patent
Wilcox (10) Patent No.: US 10,183,812 B2
(45) Date of Patent: Jan. 22, 2019

(54) TRANSPORTABLE DRIVE-OVER CONVEYOR SYSTEM

(71) Applicant: Ag Growth International Inc., Winnipeg (CA)

(72) Inventor: Brian Wilcox, Rosenort (CA)

(73) Assignee: AG GROWTH INTERNATIONAL INC., Winnipeg (CA)

( * ) Notice: Subject to any disclaimer, the term of this patent is extended or adjusted under 35 U.S.C. 154(b) by 0 days.

(21) Appl. No.: 15/888,807

(22) Filed: Feb. 5, 2018

(65) Prior Publication Data

US 2018/0155131 A1 Jun. 7, 2018

Related U.S. Application Data

(63) Continuation of application No. 15/435,031, filed on Feb. 16, 2017, now Pat. No. 9,884,731.

(60) Provisional application No. 62/295,829, filed on Feb. 16, 2016.

(30) Foreign Application Priority Data

Feb. 17, 2016 (CA) ..................................... 2921123

(51) Int. Cl.
| | |
|---|---|
| B65G 41/00 | (2006.01) |
| B65G 67/24 | (2006.01) |
| B60P 1/43 | (2006.01) |
| B65G 15/00 | (2006.01) |
| B65G 33/14 | (2006.01) |
| B66F 3/22 | (2006.01) |
| A01D 61/00 | (2006.01) |

(52) U.S. Cl.
CPC ........... *B65G 41/008* (2013.01); *A01D 61/00* (2013.01); *B60P 1/433* (2013.01); *B65G 15/00* (2013.01); *B65G 33/14* (2013.01); *B65G 67/24* (2013.01); *B66F 3/22* (2013.01)

(58) Field of Classification Search
CPC ........ B65G 30/00; B65G 67/24; B65G 41/00; B65G 41/002; B65G 2207/28; B65G 41/008; B65G 67/00
USPC .......... 198/610, 587, 313; 414/573, 575, 809
See application file for complete search history.

(56) References Cited

U.S. PATENT DOCUMENTS

| | | |
|---|---|---|
| 5,964,566 A | 10/1999 | Stewart et al. |
| 6,966,740 B2 | 11/2005 | Mast et al. |
| 7,090,066 B2 | 8/2006 | Kirsch |
| 7,424,943 B2 | 9/2008 | Gausman et al. |
| 7,607,529 B2 | 10/2009 | Gausman et al. |
| 8,118,151 B1 | 2/2012 | Jesse |
| 8,584,827 B1 | 11/2013 | Jesse |

(Continued)

OTHER PUBLICATIONS

Office Action issued in related Canadian Patent Application No. 3,019,788 dated Oct. 29, 2018, pp. 1-4.

*Primary Examiner* — James R Bidwell
(74) *Attorney, Agent, or Firm* — Armstrong Teasdale LLP (57) ABSTRACT

A transportable drive-over conveyor system includes a drive-over hopper for receiving material and having a belt-type conveyor for conveying the material, a transition section pivotally connected to the drive-over hopper, an auger mounted at a downstream end of the transition section, and wheels beneath the auger that support and move the conveyor system. At least one wheel is a drive wheel. The wheels may be radially offset. The wheels may be arced to travel in arced tracks.

14 Claims, 9 Drawing Sheets

(56) References Cited

U.S. PATENT DOCUMENTS

| | | | |
|---|---|---|---|
| 8,662,285 B2* | 3/2014 | Jesse | B65G 41/002 |
| | | | 198/300 |
| 8,820,515 B2 | 9/2014 | Houssian | |
| 9,663,303 B2 | 5/2017 | Waldner et al. | |
| 9,701,481 B2 | 7/2017 | Wilcox et al. | |
| 9,707,481 B2* | 7/2017 | Perlman | A63F 13/12 |
| 9,975,712 B2* | 5/2018 | Friesen | B65G 67/24 |
| 10,053,308 B2* | 8/2018 | Toews | B65G 47/18 |
| 2005/0123385 A1 | 6/2005 | Kirsch | |
| 2015/0078878 A1 | 3/2015 | Wilcox et al. | |

\* cited by examiner

TRANSPORTABLE DRIVE-OVER CONVEYOR SYSTEM

CROSS-REFERENCE TO RELATED APPLICATIONS

This application is a continuation of U.S. patent application Ser. No. 15/435,031, filed on Feb. 16, 2017, which claims priority to U.S. Provisional Patent Application Ser. No. 62/295,829, filed on Feb. 16, 2016, and Canadian Patent Application Serial No. 2,921,123, filed on Feb. 17, 2016, the disclosures of which are hereby incorporated by reference in their entirety.

TECHNICAL FIELD

The present invention relates generally to agricultural conveyors for conveying grain or other particulate matter and, more particularly, to drive-over conveyors.

BACKGROUND

Offloading grain from a grain truck or other transport vehicle may be done with a swing-type auger that is swung underneath the grain-storage tank or by driving the truck over a drive-over hopper. Grain is then discharged downwardly onto the drive-over hopper or onto the swing-type auger. Both of these prior-art systems have drawbacks. Swing-type augers are cumbersome and slow to maneuver. Drive-over hoppers typically need to be assembled and moved each time an unloading operation is to be performed.

Co-assigned U.S. Patent Application Publication US 2015/0078878 (Wilcox et al.) discloses a drive-over transportable conveyor system. Further improvements to this system are motivated by the inventors having recognized that grain handling productivity may be augmented by improving the maneuverability of the conveyor system and/or by improving the folding and unfolding mechanism of the conveyor system.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a novel transportable drive-over conveyor system that is designed to be folded and lifted by a folding and lifting mechanism. The drive-over conveyor system has a belt-type conveyor and auger as well as a transition section for transferring grain or other material from the belt-type conveyor to the auger. Foldable ramps are pivotally mounted to the sides of the belt conveyor. The folding and lifting mechanism connects via hooks to the ramps to fold the ramps and then to lift the conveyor system by the ramps.

One inventive aspect of the disclosure is a transportable drive-over conveyor system comprising a drive-over hopper for receiving material and having a belt-type conveyor for conveying the material, a transition section pivotally connected at an upstream end to the drive-over hopper, an auger mounted at a downstream end of the transition section, wherein the transition section transfers the material from the belt-type conveyor to the auger, wheels for supporting and moving the conveyor system, wherein at least one wheel is a drive wheel, a pair of foldable ramps having hooks and a folding and lifting mechanism connected to the hooks on the ramps for folding the foldable ramps and lifting the conveyor system by the ramps.

Another inventive aspect of the disclosure is a method of folding a transportable drive-over conveyor system having a drive-over belt-type hopper and auger. The method entails powering off the belt-type hopper and auger, moving the conveyor system using wheels supporting the conveyor system to a folding location, and folding and lifting a pair of foldable ramps pivotally mounted to the hopper by actuating a folding and lifting mechanism connected to hooks on the ramps to thereby fold the ramps and lift the conveyor system by the ramps.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Conveyor System

Figure 1:
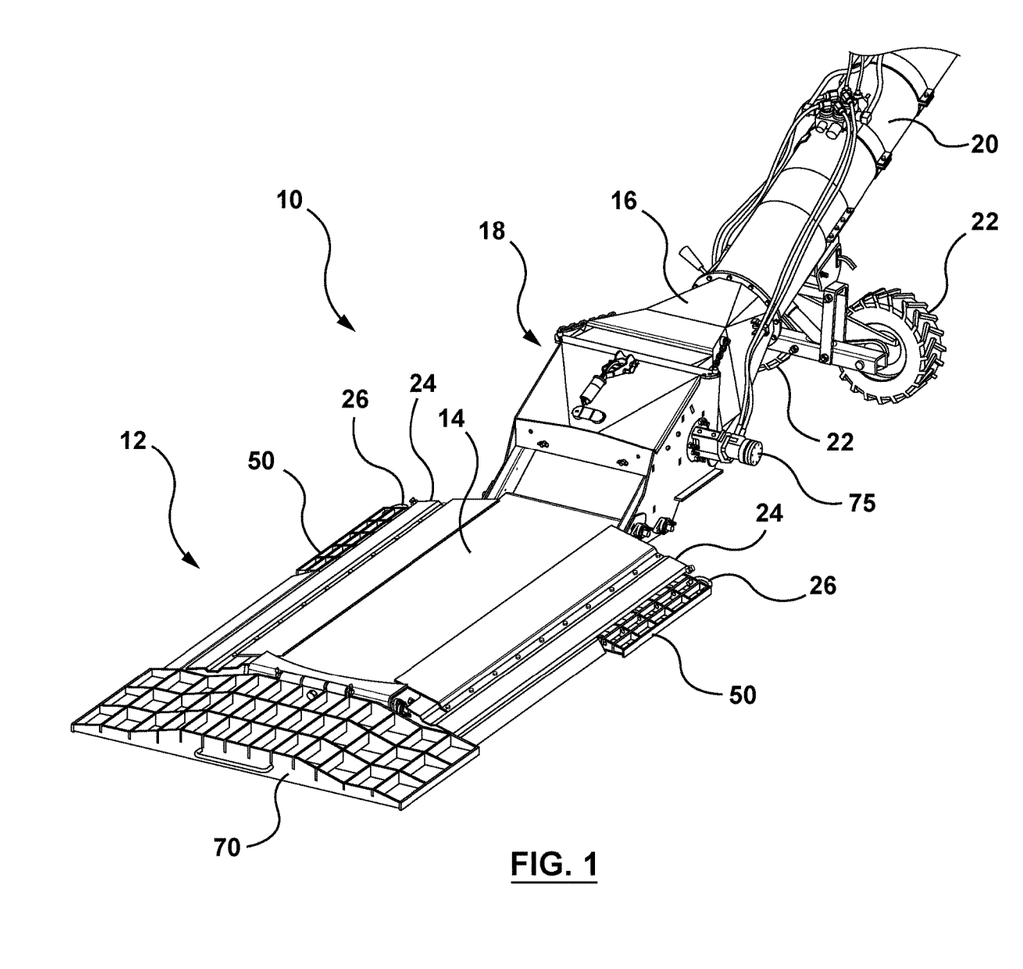
FIG. 1 is an isometric view of a drive-over conveyor system in accordance with an embodiment of the present invention.
Figure 1A:
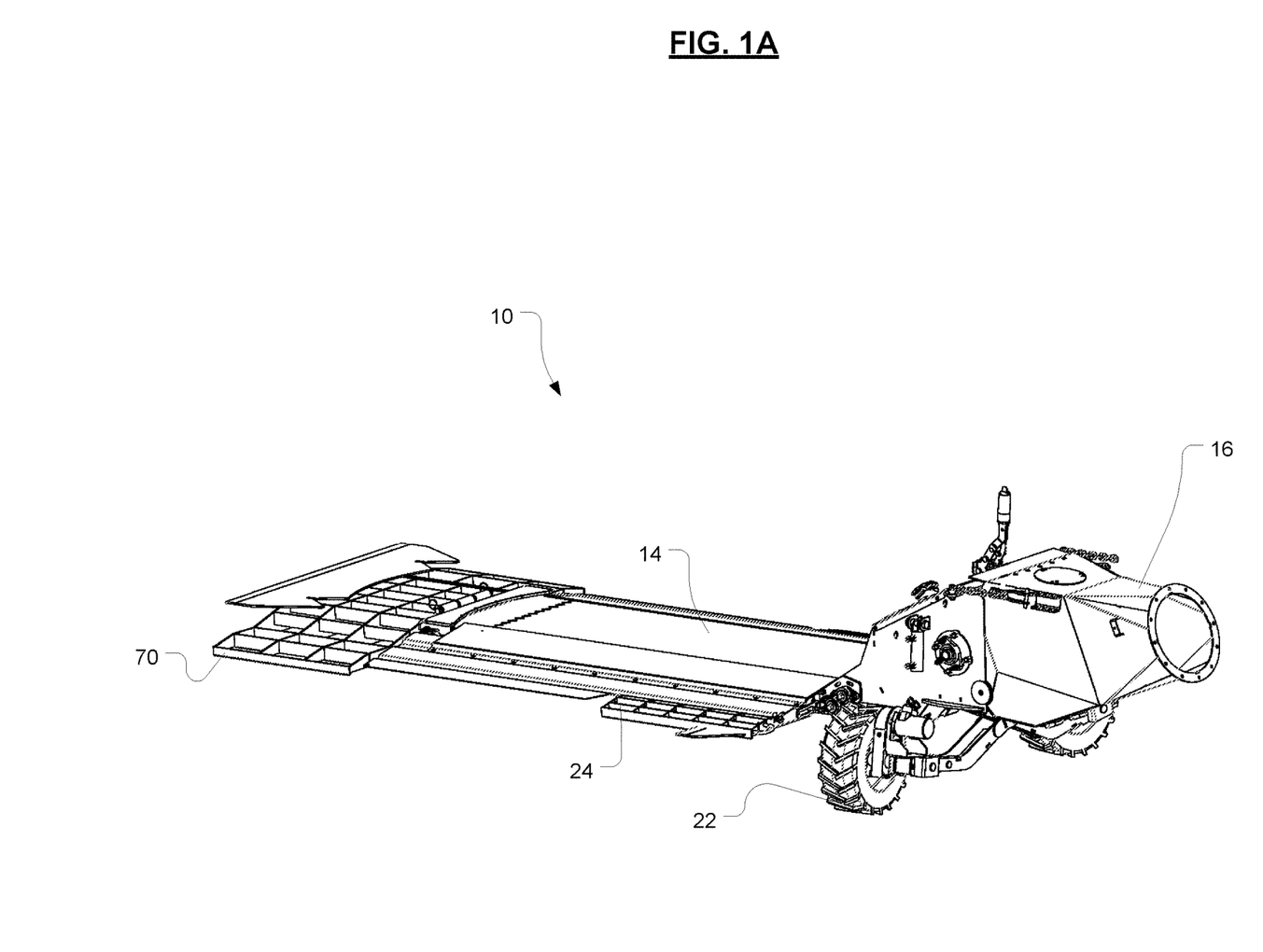
FIGS. 1A and 1B show a conveyor system in accordance with another embodiment.
Figure 1B:
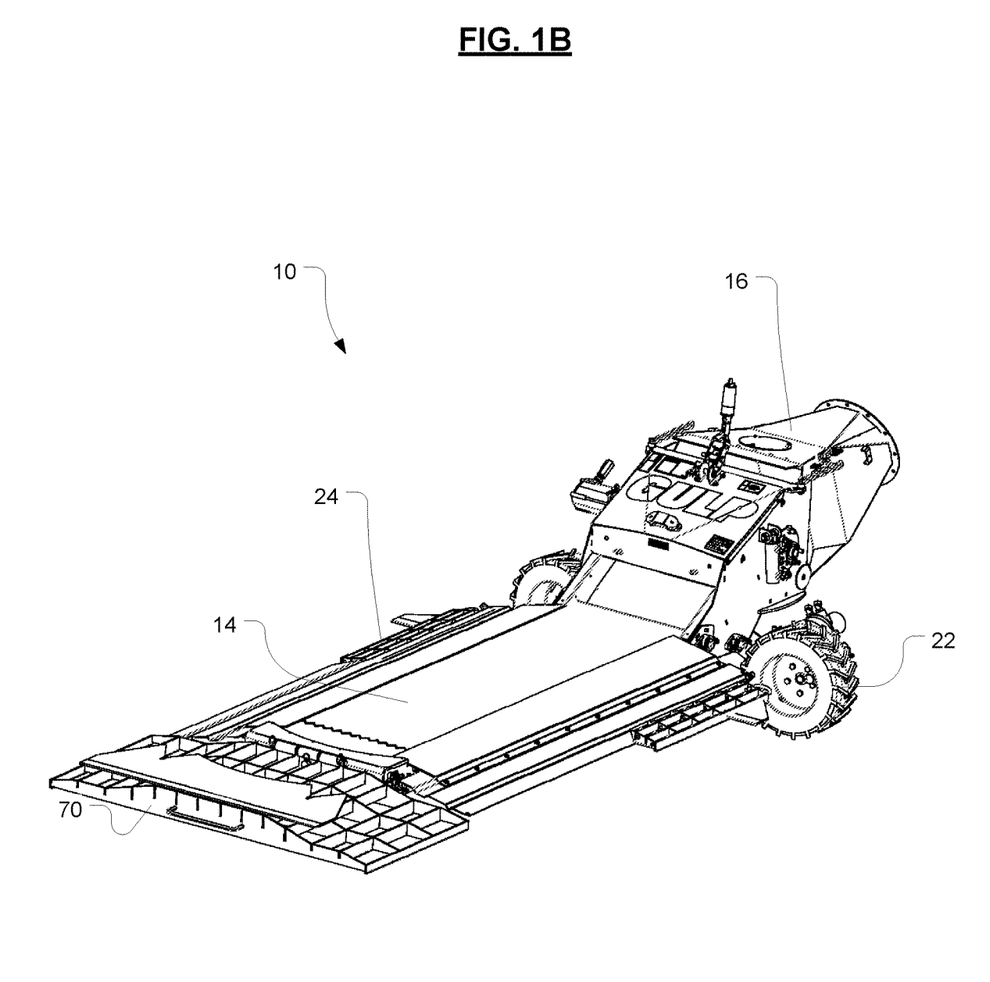

An exemplary embodiment of the conveyor system is depicted schematically in FIG. 1. It should be understood that this exemplary embodiment represents only one way of implementing this technology. In other words, many variations, modifications and refinements may be made to the system presented herein without departing from the fundamental inventive concept or concepts.

In the embodiment shown by way of example in FIG. 1, a transportable drive-over conveyor system, which is generally denoted by reference numeral 10, includes a drive-over hopper 12 for receiving material (e.g. grain or a particulate grain-like material) and has a belt-type conveyor 14 for conveying the material. Due to its geometry, this conveyor system is easy to maneuver, provides a large catchment area, and is very low profile, making it easy to drive over. The conveyor system includes a transition section 16 pivotally connected at an upstream end 18 to the drive-over hopper. The conveyor system includes an auger 20 mounted at a downstream end of the transition section, wherein the transition section transfers the material from the belt-type conveyor to the auger. The conveyor system includes wheels 22 for supporting and moving the conveyor system to and from a grain-unloading position. The conveyor system also includes a pair of foldable ramps 24 that enable the conveyor system to be easily folded and unfolded. The ramps of the conveyor system each have their own hooks 26. In the illustrated embodiment, the hooks 26 are disposed on the downstream ends of the ramps as shown so as to not interfere with the truck driving over the ramps.

Figure 2:
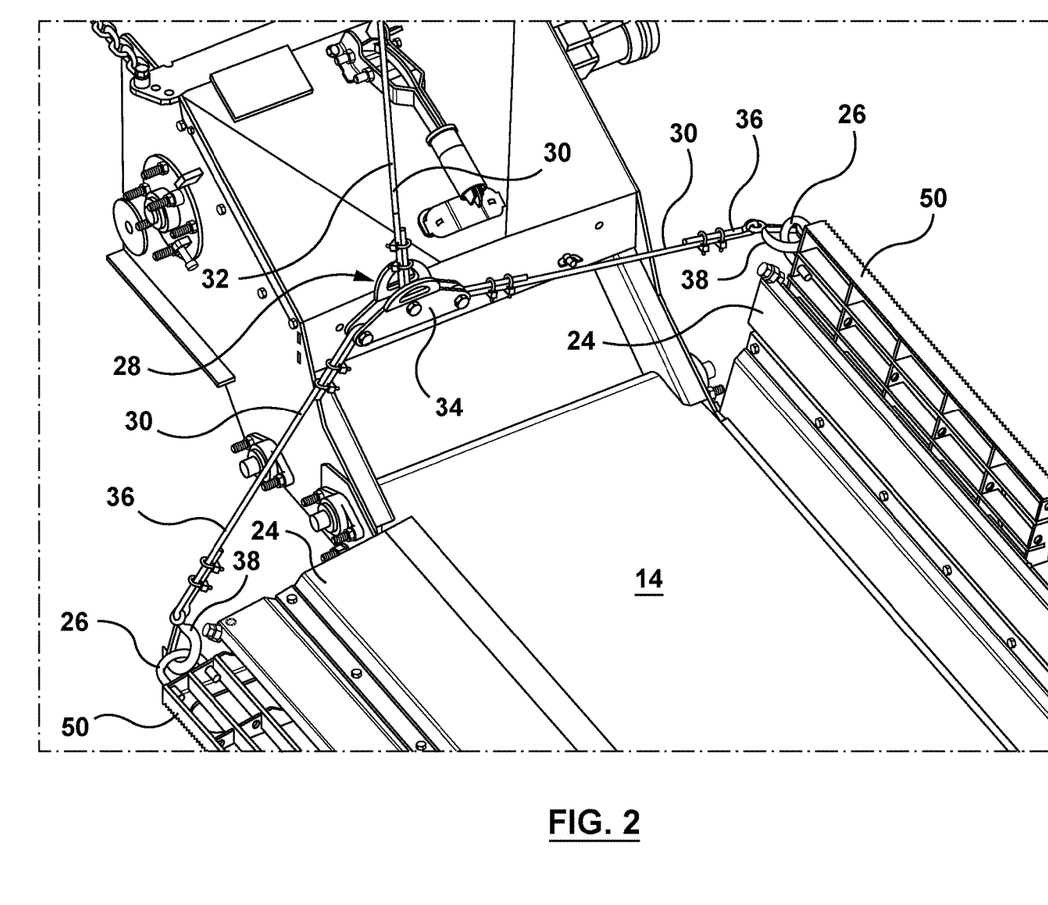
FIG. 2 is an isometric view of a folding and lifting mechanism comprising cables for folding the ramps of the conveyor system and for lifting the conveyor system.

As shown in FIG. 2, the conveyor system further includes a lifting and folding mechanism 28. In the embodiment illustrated in FIG. 2, the lifting and folding mechanism 28 comprises cables 30 (e.g. steel cables) connected to the hooks for folding the foldable ramps and for lifting the conveyor system. In alternative embodiments, the lifting and folding mechanism may be designed with suitable rigid linkages or chains to performing the folding and lifting functions. In the embodiment illustrated in FIG. 2, the folding and lifting mechanism 28 includes a primary cable segment 32 connected via a cable yoke 34 to a pair of secondary cable segments 36 that have connectors 38 adapted to connect to the hooks 26 on the ramps 24. The cable yoke 36 may also be a cable diverter plate or any other equivalent device or mechanism enabling a single main cable to transfer its pulling force to two symmetrical secondary cables. The cables thus define an inverted Y-shaped geometry. The cables may be a wire rope or braided cable, either bare stainless or galvanized steel or covered in a polymer sheath. In a variant, the one or more of the cables may be replaced with chains. It will be appreciated that any other equivalent means for connecting, hooking or attaching the cables to the ramps or flaps may be employed. The connectors and hooks may be loops or eyelets with thimbles, spring-loaded clips, shackles, slings, turnbuckles, or any other rings, brackets, couplings, links, anchors or connecting devices for connecting the cables to the ramps or flaps.

Figure 3:
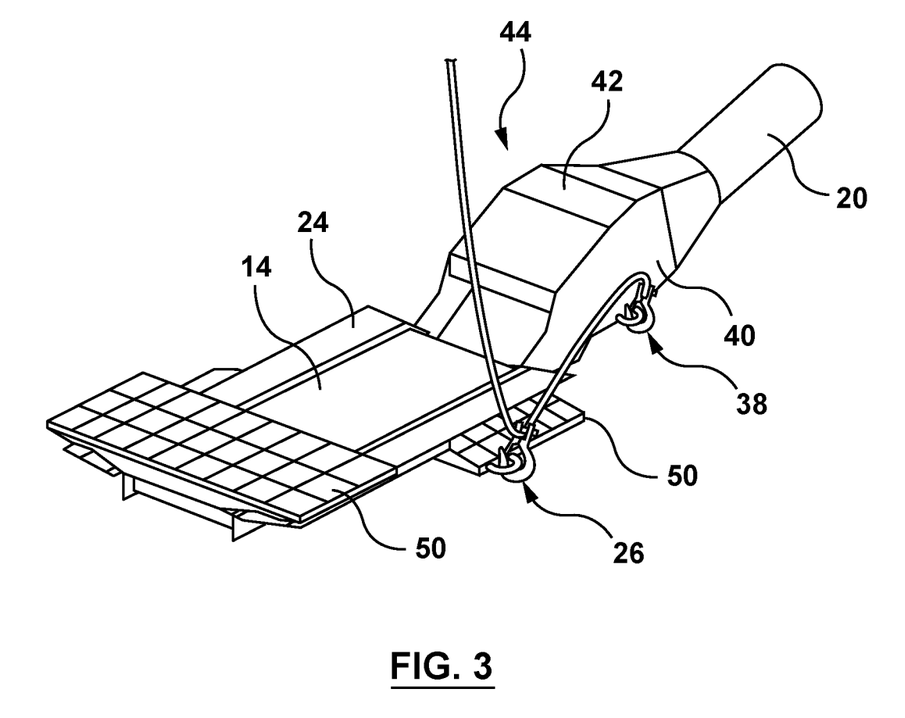
FIG. 3 is an isometric view of a conveyor system equipped with another type of folding and lifting mechanism.

In another embodiment depicted in FIG. 3, the secondary cable segments loop through the hooks on the ramps and are anchored to a pair of fixed hooks 38 mounted to sides 40 of a housing 42 of a grain-discharging section 44 of the hopper. The folding and lifting mechanism 28 includes a motor-driven winch, pulley, rotary hydraulic actuator or equivalent mechanism to exert a tensile force on the cable sufficient to lift and fold the ramps of the conveyor system. The lift mechanism may be powered by a gasoline or diesel engine, an electric motor, a hydraulic motor, a PTO of a tractor or any other mechanically suitable power plant. It will be appreciated that in one embodiment the ramps fold until they are fully folded at which point the continued application of tensile (upward pulling) force on the cables causes the entire conveyor to be lifted off the ground.

In the illustrated embodiment, the foldable ramps 24 may be articulated or segmented ramps which are formed of an inner ramp and an outer ramp. The outer ramp, denoted by reference numeral 50, may be a hinged flap or flap-like articulated extension of the ramp 24. For clarity, the term "ramp" includes both the inner ramp and the outer ramp (or flap). In this embodiment, the hooks are disposed on the ramps 24. Specifically, the hooks may be disposed on a most forward and most outward portion of each of the ramps. In the illustrated embodiment, the ramps may optionally include grates for lower weight and better traction.

Figure 4:
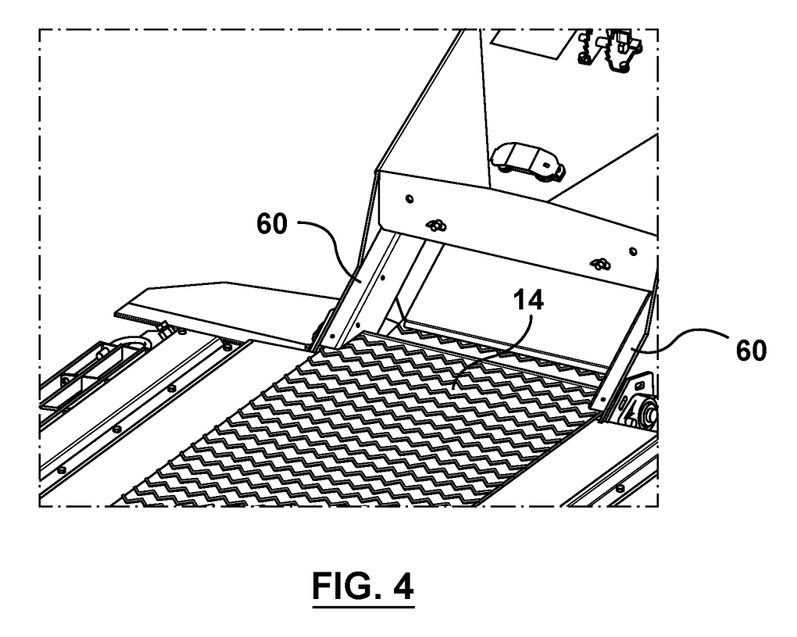
FIG. 4 is an isometric view of a portion of a conveyor system equipped with sealing brackets.
Figure 5:
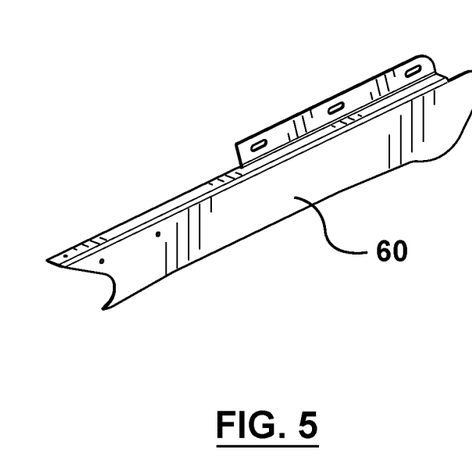
FIG. 5 is an isometric view of a sealing bracket.

As shown by way of example in FIG. 4 and FIG. 5, the conveyor system includes inclined sealing brackets 60 each having a contoured notch substantially matching a profile of the belt-type conveyor 14 at its forward end. These sealing brackets help to keep the grain or other matter from spilling sideways off the conveyor. These sealing brackets thus improve the efficient transfer of grain from the conveyor belt to the auger.

In the illustrated embodiment, the two wheels 22 are pivotally mounted to each side of the transition section 16. One or both of the wheels 22 may be drive wheels. This arrangement makes the conveyor system more stable (less tippy) and thus more maneuverable. The wheels 22 may be connected to a hydraulically-powered wheel deployment and retraction mechanism for hydraulically deploying and retracting the wheels. A manual jack may optionally be provided to lower and raise the wheels.

In addition to the ramps 24, the conveyor system includes a foldable grate 70 in the illustrated embodiment. This foldable grate 70 folds about an axis perpendicular to the axes about which the ramps 24 fold. The ramps 24 fold about respective axes that are parallel to the direction of conveyance of the belt-type conveyor whereas the foldable grate 70 folds about an axis that is perpendicular to the direction of conveyance of the belt-type conveyor. FIG. 1 shows the foldable grate 70 unfolded in its deployed position. FIG. 3 shows the foldable grate 70 folded in its stowed position.

In the illustrated embodiment, the belt-type conveyor 14 is either fixed-angle or adjustable in angle and operates at an angle of up to 25 degrees from a horizontal plane and whereas the auger 20 is also either fixed-angle or adjustable in angle and operates at an angle of up to 45 degrees from the horizontal plane. However, it will be appreciated that in other embodiments, the belt-type conveyor 14 may operate above 25 degrees and/or the auger 20 may operate above 45 degrees. In this embodiment, a drive motor 75 is provided for driving the belt-type conveyor 14. In the illustrated embodiment, the belt-type conveyor 14 is driven by a hydraulic motor 75 connected to a drive shaft connected to a pulley or drum for advancing the belt of the belt-type conveyor. The drive motor 75 may be mounted with a grain-discharging section 44.

The hopper 12 includes a flat conveyor belt 14 followed by a raised or inclined grain-discharging section 44. In this embodiment, the grain-discharging section 44 has an inclined/ramped belt portion inside the housing 42 that elevates the grain as the grain travels up the inclined/ramped belt portion. Grain is dumped (i.e. poured, cascaded or otherwise transferred) from the downstream end of the inclined/ramped belt portion onto extension fighting of the auger 20. The extension flighting of the auger 20 extends into the transition section from the main fighting. In this embodiment, the extension flighting extending into the transition section 16 is an extension of the main fighting. The extension fighting is mechanically coupled or joined to the main flighting. Note that the extension flighting and main fighting may have different pitches (turns per inch).

The belt travel path in this embodiment is an S-shaped path followed by an inclined path (corresponding to the inclined/ramped belt portion) to elevate the grain relative to a lower portion of the fighting of the auger 20 and to dump the grain onto the lower portion of the fighting of the auger 20 (i.e. onto the extension fighting). The inclined belt path is inclined relative to the main conveying path (i.e. the path of the belt along the main horizontal (flat) conveying section. The S-shaped path is located at or near the junction of the flat portion of the belt conveyor and the inclined portion.

The transition section 16 has an upstream end and a downstream end. The transition section 16 is a key component of the conveyor system because this is where the belted hopper unloads the grain (or other material) onto the helical screw (fighting) of the auger 20. The transition section 16 was designed to ensure it could feed the auger 20 at its maximum capacity. The transition section 16 also provides an attachment point for the belted hopper. When the auger angle changes, the angle of the auger relative to the hopper also changes. Therefore, the transition section has to allow for this rotation while still having the belt feed the transition section without spilling.

Figure 6:
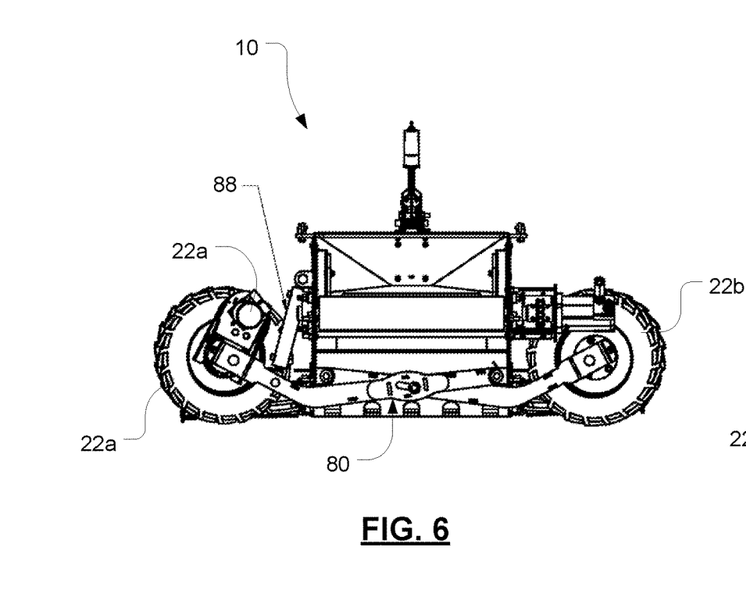
FIG. 6 is a rear view of the conveyor system showing a scissor-lift mechanism in a retracted position.
Figure 7:
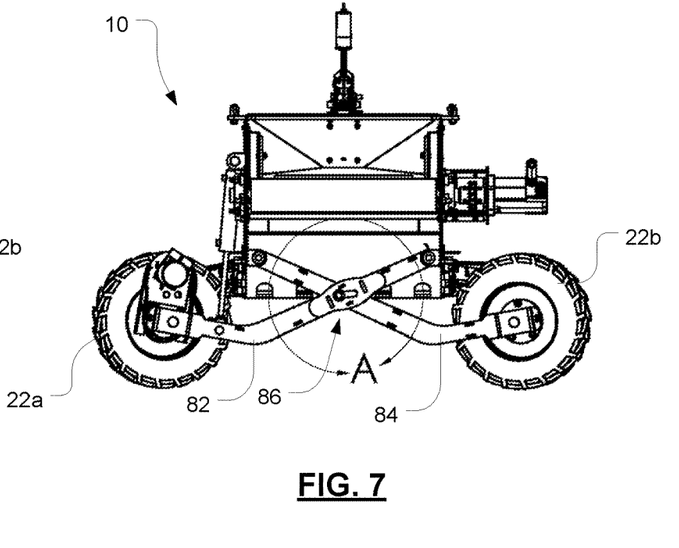
FIG. 7 is a rear view of the conveyor system showing the scissor-lift mechanism in an extended position.

FIGS. 6 and 7 depict a conveyor system 10 having a scissor-lift mechanism 80 for raising and lowering the conveyor system. FIG. 6 is a rear view of the conveyor system 10 showing the scissor-lift mechanism 80 in a retracted position (suitable for storage or transport to increase ground clearance). For transport, the conveyor system 10 can be lifted completely off the ground, i.e. the hopper 12 and the wheels 22 no longer touch the ground. The wheels may also be retracted to allow the hopper to rest stably on the ground for conveying grain or other material. FIG. 7 is a rear view of the conveyor system 10 showing the scissor-lift mechanism 80 in an extended position (suitable for displacing the conveyor over the ground). The wheels are lowered (extended) to enable the hopper to be repositioned along the ground into different working positions. The scissor-lift mechanism 80 comprises a first arm 82 and a second arm 84 pivotally connected to the first arm at a slotted joint 86. The first arm 82 and the second arm 84 crisscross to form a generally X-shaped mechanism.

In the embodiment depicted in FIGS. 6 and 7, a single lift cylinder 88 actuates the scissor-lift mechanism. The single lift cylinder 88 may be, for example, a hydraulic cylinder. In the example configuration shown in FIGS. 6 and 7, the single lift cylinder 88 is mounted at an upper end to a bracket on the transition section and at a lower end to a bracket on one of the arms of the scissor-lift mechanism. In another embodiments, the scissor-lift mechanism may have more than actuator. In another embodiment, the lift cylinder could be replaced by a manually operated mechanical jack.

Figure 8:
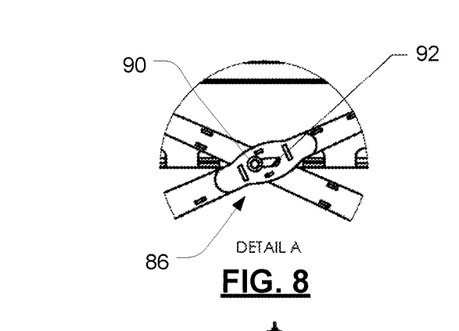
FIG. 8 is a view of Detail A of FIG. 7.

FIG. 8 is a view of Detail A of FIG. 7 showing the slotted joint 86 in the scissor-lift mechanism 80. The slotted joint 86 has a pin 90 that is movable within an oblong slot 92. In the retracted position, the pin is displaced to the right of the slot as shown in FIG. 6. In the extended position, the pin is displaced to the left of the slot as shown in FIG. 7.

Figure 9:
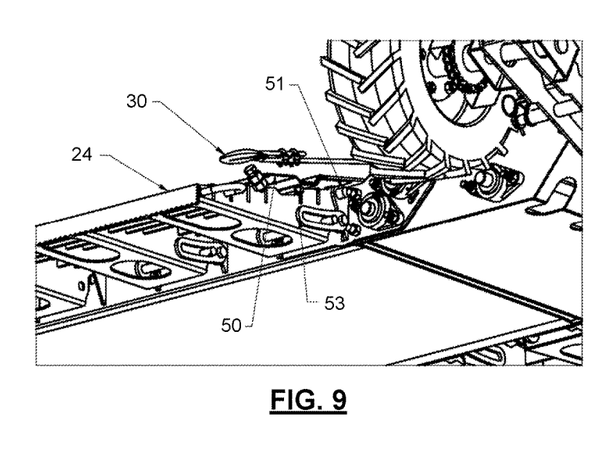
FIG. 9 is an isometric view of key lifting components of the conveyor system.

FIG. 9 is an isometric view of key components of the lifting and folding mechanism of the conveyor system 10. In the embodiment illustrated in FIG. 9, the lifting and folding mechanism uses a cable 30 to lift and fold the conveyor system. The lifting and folding mechanism folds the ramps 24, including the articulated outer ramps (flaps) 50. This figure shows the ramps and flaps connected by a ramp-flap pivot point 51. This figure also shows a ramp position locking link 53.

Figure 10:
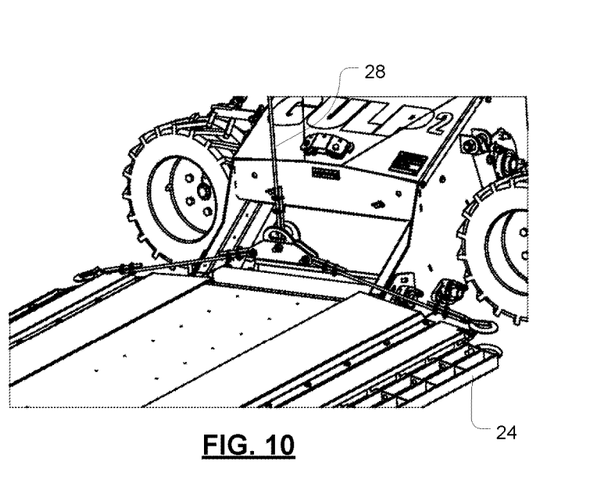
FIG. 10 is an isometric view of the conveyor system showing the ramps lowered.

FIG. 10 is an isometric view of the conveyor system 10 showing the ramps lowered. As shown in FIG. 10, the folding and lifting mechanism 28 may be a cable lift mechanism having cable segments connected to hook on the ramps 24.

Figure 11:
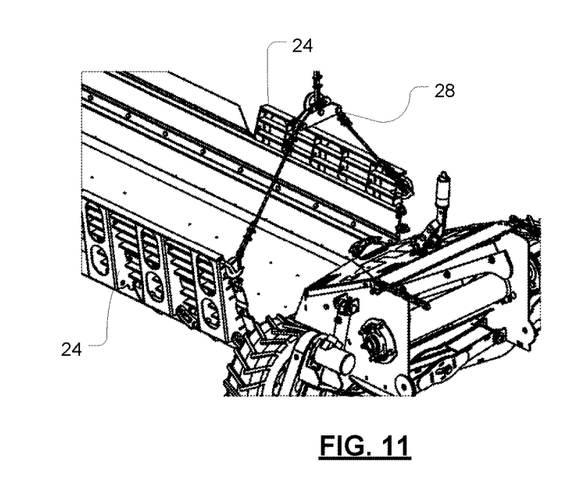
FIG. 11 is an isometric view of the conveyor system showing the ramps raised.

FIG. 11 is an isometric view of the conveyor system 10 showing the ramps 24 raised by the lifting and folding mechanism 28.

Figure 12:
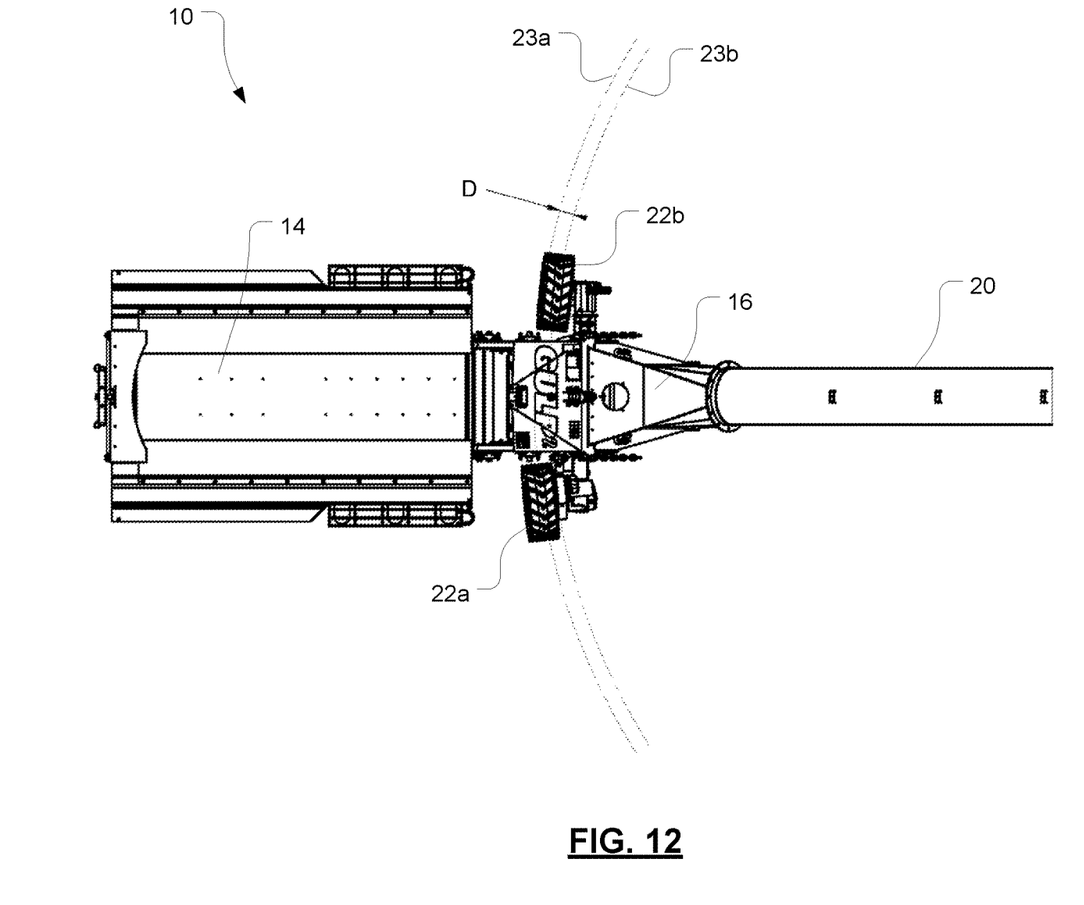
FIG. 12 is a top view of the conveyor system showing offset wheel tracks.

FIG. 12 is a top view of the conveyor system 10 having offset wheel tracks in accordance with another embodiment of the invention. In the embodiment depicted in FIG. 12, the conveyor system 10 has two offset wheels 22a, 22b that are mounted to the transition section 16 between the conveyor belt 14 and the auger 20. The offset wheels 22a, 22b are arced such that they travel in parallel arced tracks 23a, 23b as shown in this figure. The arced tracks 23a, 23b are separated by a radial distance D. The radially offset wheels provide greater stability and better traction. If one wheel gets stuck in a rut, or otherwise loses traction, the second wheel may be able to provide the necessary traction to displace the conveyor system. The offset wheels also distribute the hopper weight and provide for less compaction of the ground when positioning the hopper. In one embodiment, both wheels are drive wheels, i.e. each wheel has a respective hydraulic or electric motor providing torque to the wheel. In another embodiment, only one of the wheels is a drive wheel.

Method

Another inventive aspect of this disclosure is a novel method of folding a transportable drive-over conveyor system having a drive-over belt-type hopper and auger. In general, the method is performed by powering off the belt-type hopper and auger and then moving the conveyor system using wheels supporting the conveyor system to a folding location, e.g. away from the grain-unloading truck. The method is completed by folding the ramps and then lifting the conveyor system by the ramps.

Actuating the lift mechanism may involve exerting a lifting force on a primary cable segment connected via a cable yoke to a pair of secondary cable segments that have connectors adapted to connect to the hooks on the ramps.

The method may further involve looping the secondary cable segments through the hooks on the ramps and anchoring the secondary cable segments to a pair of fixed hooks mounted to sides of a housing of a grain-discharging section of the hopper.

Prior to folding and lifting, the method may entail conveying the material from the belt-type conveyor to the transition section using inclined sealing brackets each having a contoured notch substantially matching a profile of a forward end of the belt-type conveyor.

Prior to folding and lifting, the method may entail moving the conveyor using the wheels, wherein the wheels are radially offset and arced to travel in parallel arced tracks.

Prior to folding and lifting, the method may entail lowering the conveyor system using a scissor-lift mechanism having a single lift cylinder. The method may also entail raising the conveyor system using the scissor-lift mechanism.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A transportable drive-over conveyor system comprising:
   a drive-over hopper for receiving material and having a belt-type conveyor for conveying the material;
   a transition section pivotally connected to the drive-over hopper;
   an auger mounted at a downstream end of the transition section, wherein the transition section transfers the material from the belt-type conveyor to the auger; and
   wheels beneath the auger for supporting and moving the conveyor system, wherein at least one wheel is a drive wheel, wherein the wheels are radially offset.

2. The conveyor system of claim 1 wherein the wheels are arced to travel in parallel arced tracks.

3. The conveyor system of claim 2 comprising exactly two wheels.

4. The conveyor system of claim 1 comprising exactly two wheels.

5. The conveyor system of claim 4 wherein both wheels are drive wheels.

6. The conveyor system of claim 1 wherein the wheels are pivotally mounted to the transition section.

7. The conveyor system of claim 1 wherein the wheels are connected to a wheel deployment and retraction mechanism.

8. A transportable drive-over conveyor system comprising:
   a drive-over hopper for receiving material and having a belt-type conveyor for conveying the material;
   a transition section pivotally connected to the drive-over hopper;
   an auger mounted at a downstream end of the transition section, wherein the transition section transfers the material from the belt-type conveyor to the auger; and
   wheels beneath the auger for supporting and moving the conveyor system, wherein at least one wheel is a drive wheel, wherein the wheels are arced to travel in arced tracks.

9. The conveyor system of claim 8 wherein the wheels are radially offset.

10. The conveyor system of claim 9 comprising exactly two wheels.

11. The conveyor system of claim 8 comprising exactly two wheels.

12. The conveyor system of claim 11 wherein both wheels are drive wheels.

13. The conveyor system of claim 8 wherein the wheels are pivotally mounted to the transition section.

14. The conveyor system of claim 8 wherein the wheels are connected to a wheel deployment and retraction mechanism.

* * * * *

UNITED STATES PATENT AND TRADEMARK OFFICE
CERTIFICATE OF CORRECTION

PATENT NO. : 10,183,812 B2  
APPLICATION NO. : 15/888807  
DATED : January 22, 2019  
INVENTOR(S) : Brian Wilcox Page 1 of 1

It is certified that error appears in the above-identified patent and that said Letters Patent is hereby corrected as shown below:

In the Specification

Column 5, Lines 1-9:
Delete "otherwise transferred) from the downstream end of the inclined/ramped belt portion onto extension fighting of the auger 20. The extension flighting of the auger 20 extends into the transition section from the main fighting. In this embodiment, the extension flighting extending into the transition section 16 is an extension of the main fighting. The extension fighting is mechanically coupled or joined to the main flighting. Note that the extension flighting and main fighting may have different pitches (turns per inch)."
Insert --otherwise transferred) from the downstream end of the inclined/ramped belt portion onto extension flighting of the auger 20. The extension flighting of the auger 20 extends into the transition section from the main flighting. In this embodiment, the extension flighting extending into the transition section 16 is an extension of the main flighting. The extension flighting is mechanically coupled or joined to the main flighting. Note that the extension flighting and main flighting may have different pitches (turns per inch).--

Column 5, Lines 13-15:
Delete "a lower portion of the fighting of the auger 20 and to dump the grain onto the lower portion of the fighting of the auger 20 (i.e. onto the extension fighting). The inclined belt path"
Insert --a lower portion of the flighting of the auger 20 and to dump the grain onto the lower portion of the flighting of the auger 20 (i.e. onto the extension flighting). The inclined belt path--

Column 5, Line 25:
Delete "screw (fighting) of the auger 20. The transition section 16"
Insert --screw (flighting) of the auger 20. The transition section 16--

Signed and Sealed this  
Eighteenth Day of June, 2019

Andrei Iancu  
*Director of the United States Patent and Trademark Office*